United States Patent
Rao et al.

(10) Patent No.: US 12,132,315 B2
(45) Date of Patent: Oct. 29, 2024

(54) PARAMETER DESIGN METHOD FOR SERIES PASSIVE IMPEDANCE ADAPTER APPLICABLE TO VOLTAGE SOURCE CONVERTER BASED HIGH VOLTAGE DIRECT CURRENT (VSC-HVDC) TRANSMISSION SYSTEM

(71) Applicants: ELECTRIC POWER RESEARCH INSTITUTE. CHINA SOUTHERN POWER GRID, Guangdong (CN); CHINA SOUTHERN POWER GRID, Guangdong (CN)

(72) Inventors: Hong Rao, Guangdong (CN); Changyue Zou, Guangdong (CN); Shukai Xu, Guangdong (CN); Yan Li, Guangdong (CN); Xiaobin Zhao, Guangdong (CN); Weiwei Li, Guangdong (CN); Junjie Feng, Guangdong (CN); Shuangfei Yang, Guangdong (CN); Ting Hou, Guangdong (CN); Lingfei Li, Guangdong (CN); Yuke Ji, Guangdong (CN)

(73) Assignees: ELECTRIC POWER RESEARCH INSTITUTE. CHINA SOUTHERN POWER GRID, Guangzhou (CN); CHINA SOUTHERN POWER GRID, Guangzhou (CN)

(*) Notice: Subject to any disclaimer, the term of this patent is extended or adjusted under 35 U.S.C. 154(b) by 0 days.

(21) Appl. No.: 17/798,078

(22) PCT Filed: Jun. 6, 2021

(86) PCT No.: PCT/CN2021/098509
§ 371 (c)(1),
(2) Date: Aug. 7, 2022

(87) PCT Pub. No.: WO2022/233079
PCT Pub. Date: Nov. 10, 2022

(65) Prior Publication Data
US 2024/0204528 A1    Jun. 20, 2024

(30) Foreign Application Priority Data

May 7, 2021    (CN) ........................ 202110497674.7

(51) Int. Cl.
*H02J 3/01*        (2006.01)
*H02J 3/18*        (2006.01)
(Continued)

(52) U.S. Cl.
CPC ....... *H02J 3/34* (2013.01); *H02J 3/01* (2013.01); *H02J 3/1807* (2013.01); *H02J 3/36* (2013.01);
(Continued)

(58) Field of Classification Search
CPC .... H02J 3/34; H02J 3/01; H02J 3/1807; H02J 3/36; H02J 2003/365; H02M 1/0048; H02M 1/12; H02M 7/4835
See application file for complete search history.

(56) References Cited

U.S. PATENT DOCUMENTS

| | | | |
|---|---|---|---|
| 10,345,361 B2* | 7/2019 | Choi | ........... G01R 31/40 |
| 2013/0176751 A1* | 7/2013 | Olea | ........... H02J 3/241 |
| | | | 363/16 |

(Continued)

*Primary Examiner* — Mohammad Ali
*Assistant Examiner* — Vincent W Chang (57) ABSTRACT

The present disclosure provides a parameter design method for a series passive impedance adapter applicable to a VSC-HVDC transmission system, to resolve the technical problem that high-frequency resonance may occur when impedance of a VSC-HVDC transmission system is mismatched with that of a sending-end or receiving-end grid. A (Continued)

parameter design goal of the present disclosure is that reactive power consumed by a series passive impedance adapter is not more than A times rated power of a converter, and a loss of the series passive impedance adapter in a fundamental wave is B times the rated power of the converter. The parameter design method for a series passive impedance adapter applicable to a VSC-HVDC transmission system in the present disclosure can realize a positive impedance characteristic within a concerned frequency band and completely eliminate a risk of harmonic resonance.

10 Claims, 7 Drawing Sheets

(51) Int. Cl.
*H02J 3/34* (2006.01)
*H02J 3/36* (2006.01)
*H02M 1/00* (2006.01)
*H02M 1/12* (2006.01)
*H02M 7/483* (2007.01)

(52) U.S. Cl.
CPC .......... *H02M 1/0048* (2021.05); *H02M 1/12* (2013.01); *H02M 7/4835* (2021.05); *H02J 2003/365* (2013.01)

(56) References Cited

U.S. PATENT DOCUMENTS

| | | | |
|---|---|---|---|
| 2016/0285378 A1* | 9/2016 | Oates | H02M 1/12 |
| 2017/0032070 A1* | 2/2017 | Chyun | H03H 7/01 |
| 2017/0250540 A1* | 8/2017 | Varma | H02J 3/46 |
| 2018/0076622 A1* | 3/2018 | Wilkins | H02J 3/381 |
| 2021/0391746 A1* | 12/2021 | Zou | H02J 3/36 |

* cited by examiner

PARAMETER DESIGN METHOD FOR SERIES PASSIVE IMPEDANCE ADAPTER APPLICABLE TO VOLTAGE SOURCE CONVERTER BASED HIGH VOLTAGE DIRECT CURRENT (VSC-HVDC) TRANSMISSION SYSTEM

TECHNICAL FIELD

The present disclosure relates to the technical field of optimization of a voltage source converter based high voltage direct current (VSC-HVDC) transmission system, and in particular, to a parameter design method for a series passive impedance adapter applicable to a VSC-HVDC transmission system.

BACKGROUND

In China, hydraulic energy resources are mainly concentrated in southwest regions, and power consumption loads are relatively concentrated in eastern regions. The long-distance and large-capacity "west-to-cast power transmission project" is an objective requirement of China to optimize a resource configuration and cope with an inverse distribution of energy and power loads, and is also an important measure to turn resource advantages of western underdeveloped regions into economic advantages and promote the common economic development of eastern and western regions. DC transmission adopts a power electronic conversion technique to convert sending-end clean hydropower into high-voltage DCs, and transmit the high-voltage DCs to a receiving-end load center by a long-distance overhead line, which achieves high transmission efficiency, reduces costs, and avoids power transmission corridors. DC transmission has become a main mode of "the west-to-cast power transmission project".

As a new-generation DC transmission technique based on a voltage source converter, VSC-HVDC transmission has significant advantages in new energy accommodation, economy, flexibility and reliability, and has developed rapidly in recent years. However, with an increased capacity of VSC-HVDC transmission and the large-scale application of high-power power electronic equipment in a grid, VSC-HVDC transmission has a risk of high-frequency resonance with the connected grid, affecting security and stability of the grid and security of power equipment.

Figure 1:
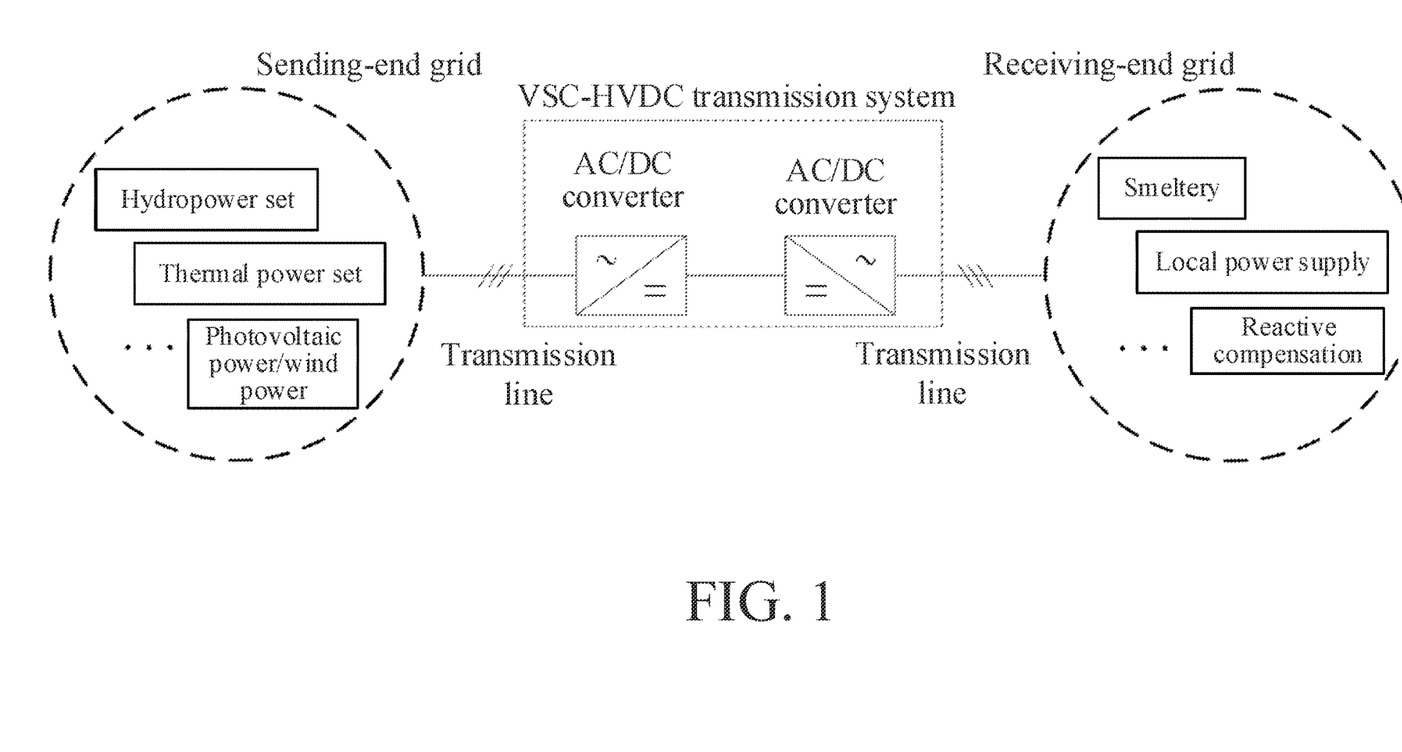
FIG. 1 is a schematic diagram of connecting a VSC-HVDC transmission system to a grid.

FIG. 1 is a schematic diagram of connecting the VSC-HVDC transmission system to a grid. When impedance of the VSC-HVDC transmission system is mismatched with that of a sending-end or receiving-end grid, high-frequency resonance may occur, threatening safe and stable operation of a power system and the VSC-HVDC transmission system.

At present, there are three kinds of harmonic resonance suppression schemes: limiting grid impedance, optimizing the impedance of the VSC-HVDC transmission system, and adding auxiliary equipment.

(1) In the prior art, the grid impedance is related to an operation mode, loads, power flows, and other factors, and its impedance amplitude and phase may change in a large range. Because the operation mode is related to many factors, and an alternating current (AC) fault such as a lightning strike may also result in a forced change of the operation mode, a scheme of limiting the operation mode to avoid harmonic resonance is difficult to be implemented as a long-term scheme.

(2) Adding the auxiliary equipment will bring additional costs, and there is no public design method for the auxiliary equipment at present.

(3) A risk of harmonic resonance can be reduced to a certain extent by optimizing a control strategy. The issued analysis shows that compared with direct feedforward, adding a low-pass filter in a feedforward loop is conducive to reducing the resonance risk. However, when a control link has a long delay, adding the low-pass filter cannot completely avoid the risk of high-frequency resonance.

It can be seen from the above that since impedance of an AC grid is related to a system operation mode, loads, and other factors, it is impossible to enumerate all possible states of the AC grid in theory. Even if there is no oscillation under analyzed grid conditions, resonance may still occur when the grid enters a special state during actual operation. The risk of harmonic resonance can be reduced by optimizing the control strategy. However, because the impedance still has a negative real part, resonance with the AC grid may still occur in theory.

SUMMARY

The present disclosure is intended to provide a parameter design method for a series passive impedance adapter, to realize a positive impedance characteristic within a concerned frequency band and completely eliminate a risk of harmonic resonance.

To resolve the above technical problem, according to a first aspect, an embodiment of the present disclosure provides a parameter design method for a series passive impedance adapter applicable to a VSC-HVDC transmission system, where the series passive impedance adapter includes a capacitor, a resistor, and an inductor, and the capacitor and the resistor are connected to the inductor in parallel after being connected in series; and the parameter design method includes the following steps:

step 1:

obtaining alternating current (AC) impedance of a VSC-HVDC transmission system within a specified frequency range; and calculating an AC impedance evaluation index of the VSC-HVDC transmission system based on the AC impedance of the VSC-HVDC transmission system;

step 2:

setting parameters A, B, and C;

calculating an initial parameter of the inductor based on a premise that a rated current only flows through a branch of the inductor and reactive power consumed by the series passive impedance adapter is preset A times rated power of a converter;

determining an initial parameter of the resistor based on a premise that a resistance value of the resistor is greater than or equal to a maximum value of the AC impedance evaluation index of the VSC-HVDC transmission system within the specified frequency range;

determining an initial parameter of the capacitor based on a premise that capacitive reactance of the capacitor is C times inductive reactance of the inductor;

determining a parameter change range of the inductor based on the initial parameter of the inductor and a preset multiple change range of the initial parameter of the inductor;

determining a parameter change range of the resistor based on the initial parameter of the resistor and a preset multiple change range of the initial parameter of the resistor;

determining a parameter change range of the capacitor based on the initial parameter of the capacitor and a preset multiple change range of the initial parameter of the capacitor;

determining a parameter combination change range based on the parameter change range of the inductor, the parameter change range of the resistor, and the parameter change range of the capacitor;

calculating a reactive power consumption and an active power loss of the series passive impedance adapter under each parameter combination within the parameter combination change range; where for any parameter combination, if the reactive power consumption of the series passive impedance adapter is greater than A times the rated power of the converter, or Re{$Z_{adapter}$(f)}>X(f) is not always satisfied within the specified frequency range, the active power loss is denoted as N*B times the rated power of the converter, where Re{$Z_{adapter}$(f)} represents a real part of an impedance transfer function of the series passive impedance adapter, and X(f) represents the AC impedance evaluation index of the VSC-HVDC transmission system; and obtaining a parameter combination with a lowest active power loss based on the active power loss of each parameter combination; and step 3:

if the parameter combination with the lowest active power loss satisfies a condition that Re{$Z_{adapter}$(f)}>X(f) is always satisfied within the specified frequency range, reducing a value of A or B, and returning to step 2 until the parameter combination with the lowest active power loss does not satisfy the condition that Re{$Z_{adapter(f)}$}>X(f) is always satisfied within the specified frequency range, so as to obtain a global optimal parameter combination; or if none of parameter combinations within the parameter combination change range satisfy the condition that Re{$Z_{adapter}$(f)}>X(f) is always satisfied within the specified frequency range, increasing a value of A or B, and returning to step 2 until a global optimal parameter is obtained.

Further, the AC impedance of the VSC-HVDC transmission system includes an AC impedance amplitude of the VSC-HVDC transmission system and an AC impedance phase of the VSC-HVDC transmission system, and the calculating an AC impedance evaluation index of the VSC-HVDC transmission system based on the AC impedance of the VSC-HVDC transmission system includes:

calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin.

Further, the calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin specifically includes:

calculating the AC impedance evaluation index of the VSC-HVDC transmission system according to a formula $$X(f) = -\min\left[mag(f) \times 10^{\frac{GM}{20}} \times \cos(\text{phase}(f) + PM),\right.$$
$$\left. mag(f) \times 10^{\frac{GM}{20}} \times \cos(\text{phase}(f) - PM)\right],$$

where mag(f) represents the AC impedance amplitude of the VSC-HVDC transmission system, phase(f) represents the AC impedance phase of the VSC-HVDC transmission system, GM represents the amplitude margin, in units of dB, and PM represents the phase angle margin, in units of deg.

Further, the real part of the impedance transfer function of the series passive impedance adapter is calculated according to a formula $$\text{Re}\{Z_{adapter}(f)\} = \text{Re}\left\{\frac{s^2 LCR + sL}{s^2 LC + sCR + 1}\right\},$$

where L represents the inductor, R represents the resistor, C represents the capacitor, and s represents a Laplace operator.

Further, the active power loss of the series passive impedance adapter is calculated a formula $$P_{loss} = \left(\frac{P_{norm}}{\sqrt{3}\, U_{grid}}\right)^2 \times \text{Re}\{Z_{adapter}(f_{fund})\},$$

where $P_{loss}$ represents the active power loss of the series passive impedance adapter, $P_{norm}$ represents rated power of the VSC-HVDC transmission system. $U_{grid}$ represents a voltage of an AC grid connected to the VSC-HVDC transmission system, and $f_{fund}$ represents a fundamental frequency.

Further, if the multiple change range of the initial parameter of the inductor is 0.8 to 1.2 times, the multiple change range of the initial parameter of the resistor is 1 to 2 times, and the multiple change range of the initial parameter of the capacitor is 0 to 1 times, the parameter change range of the inductor is (0.8 to 1.2)*the initial parameter of the inductor, the parameter change range of the resistor is (1 to 2)*the initial parameter of the resistor, and the parameter change range of the capacitor is (0 to 1)*the initial parameter of the capacitor.

Further, C is equal to 100.

Further, N is equal to 10.

According to a second aspect, an embodiment of the present disclosure provides a parameter design apparatus for a series passive impedance adapter applicable to a VSC-HVDC transmission system, including a processor, a memory, and a computer program stored in the memory and executed by the processor, where the computer program is executed by the processor to implement the parameter design method for a series passive impedance adapter applicable to a VSC-HVDC transmission system in the first aspect.

According to a third aspect, an embodiment of the present disclosure provides a computer-readable storage medium. The computer-readable storage medium stores a computer program, and the computer program is run to control a device on which the computer-readable storage medium is located to implement the parameter design method for a series passive impedance adapter applicable to a VSC-HVDC transmission system in the first aspect.

Compared with the prior art, the embodiments of the present disclosure can realize a positive impedance characteristic within a concerned frequency band and completely eliminate a risk of harmonic resonance.

BRIEF DESCRIPTION OF THE DRAWINGS

To describe the technical solutions in the present disclosure more clearly, the following briefly describes the accompanying drawings required for describing the implementations. Apparently, the accompanying drawings in the following description show merely some implementations of the present disclosure, and a person of ordinary skill in the art may further derive other drawings from these accompanying drawings without creative efforts.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be understood that step numbers in this specification are only intended to facilitate description, and are not to be used to limit a sequence of steps.

It should be understood that the terms used in the specification of the present disclosure are for the purpose of describing specific embodiments only and are not intended to limit the present disclosure. As used in the specification of the present disclosure and the appended claims, the singular forms "a", "an" and "the" are intended to include the plural forms unless the context clearly indicates otherwise.

The terms "include", "contain", and "comprise" indicate the existence of the described feature, entity, step, operation, element and/or component, but do not exclude the existence or addition of one or more other features, entities, steps, operations, elements, components and/or a combination thereof.

The term "and/or" refers to one of or any combination or all possible combinations of more of items listed in association, and includes these combinations.

Figure 2:
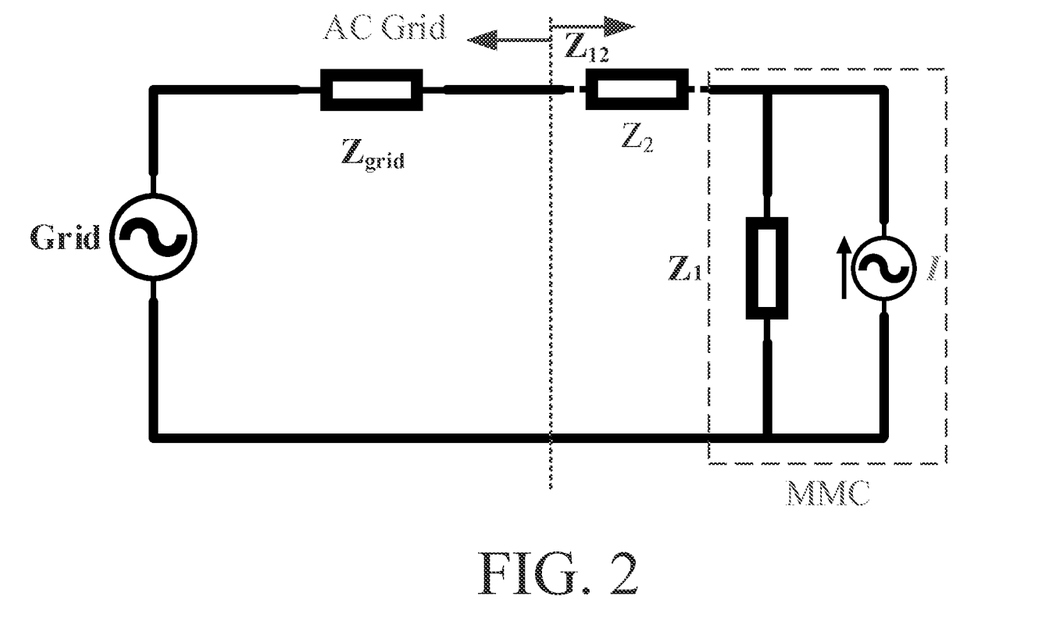
FIG. 2 is a schematic principle diagram of a series passive impedance adapter.
Figure 3:
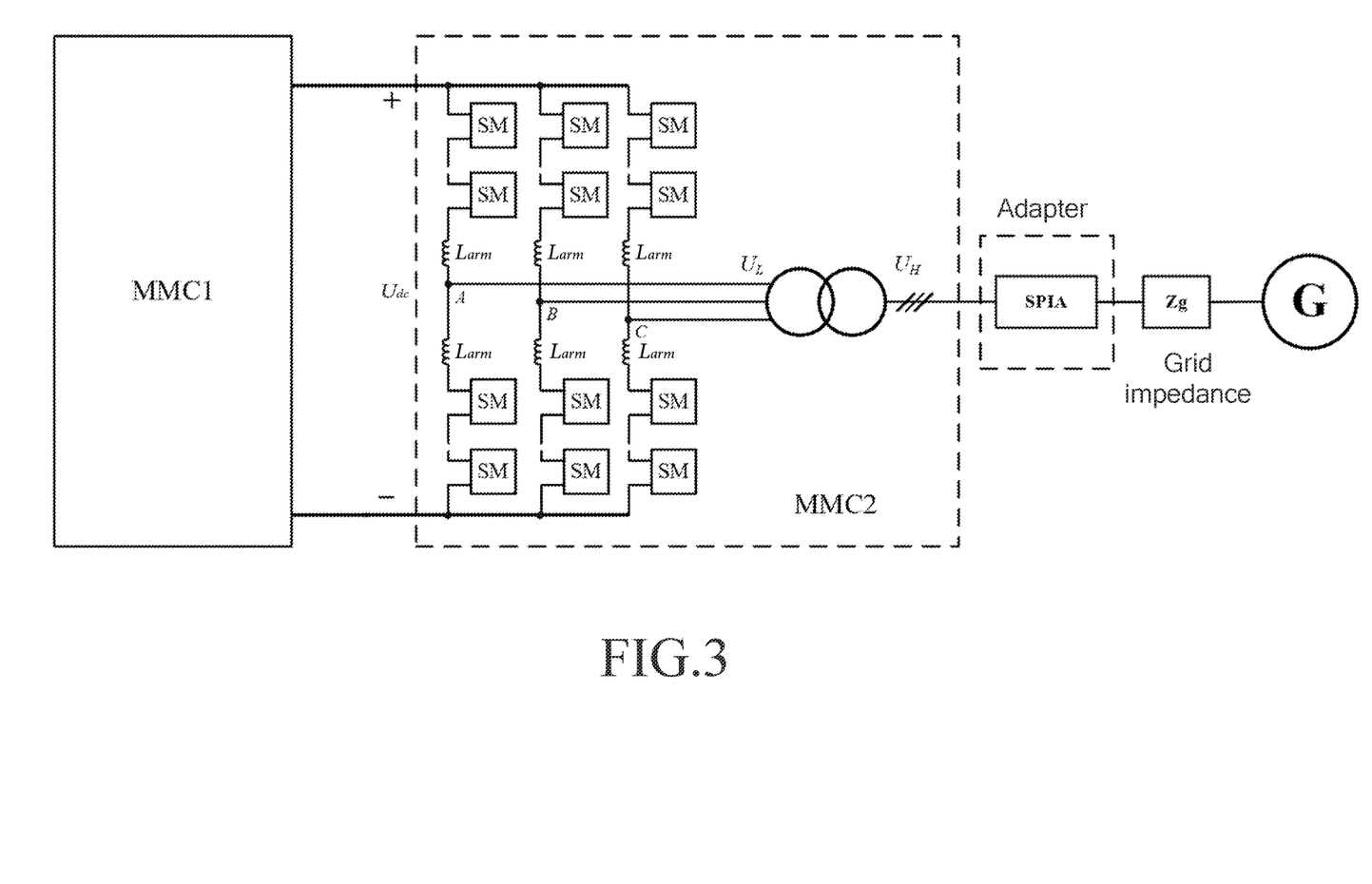
FIG. 3 is a schematic diagram of a connection position of a series passive impedance adapter (which is for schematic description only, and the adapter is also applicable to a multi-terminal system)

FIG. 2 is a schematic principle diagram of a series passive impedance adapter. FIG. 3 is a schematic diagram of a connection position of the series passive impedance adapter (which is for schematic description only, and the adapter is also applicable to a multi-terminal system). In FIG. 2, $Z_{grid}$ represents impedance of an AC grid, where an amplitude changes within (0, +∞), a phase angle changes within (−90°, +90°), and a real part is always positive. $Z_1$ represents AC impedance of a Modular Multilevel Converter (MMC) of a VSC-HVDC transmission system, and $Z_2$ represents the passive impedance adapter. $Z_1$ has a negative real part in some frequency bands, $Z_2$ has a positive real part within a preset frequency band range, and when a sum of real parts of $Z_1$ and $Z_2$ is greater than 0, a resonance risk can be eliminated.

Figure 4:
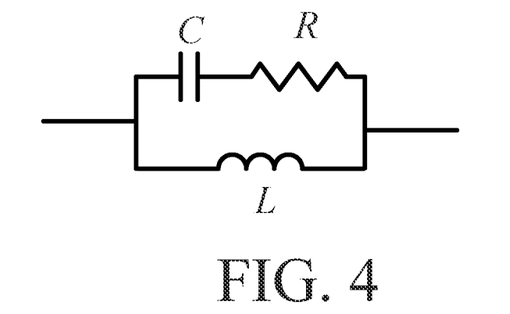
FIG. 4 is a schematic structural diagram of a most simplified series passive impedance adapter.

FIG. 4 is a schematic structural diagram of a most simplified series passive impedance adapter. The series passive impedance adapter includes a capacitor, a resistor, and an inductor, and the capacitor and the resistor are connected to the inductor in parallel after being connected in series. The resistor R, the capacitor C, and the inductor L have the following characteristics:

The resistor R and the capacitor C are resistive in medium and high frequency bands and are connected to AC impedance of the VSC-HVDC transmission system in series to ensure that a real part of impedance of a converter station is positive.

The inductor L isolates a fundamental current. The series passive impedance adapter has an inductance characteristic at a fundamental frequency to avoid an excessive loss caused by an excessive fundamental current flowing through a branch of the resistor.

To eliminate the resonance risk, a parameter design goal is that reactive power consumed by the series passive impedance adapter is not more than A times rated power of a converter, and a loss of the series passive impedance adapter in a fundamental wave is B times the rated power of the converter. For example, A is set to 2%, and B is set to 1/100000.

Based on the above series passive impedance adapter, a parameter design method for a series passive impedance adapter provided in the embodiments of the present disclosure includes steps 1 to 3, and step 2 includes sub-steps S20 to S29.

Step 1:
  Obtain AC impedance of a VSC-HVDC transmission system within a specified frequency range; and
  calculate an AC impedance evaluation index of the VSC-HVDC transmission system based on the AC impedance of the VSC-HVDC transmission system.

Step 2:
  S20: Set parameters A, B, and C.
  S21: Calculate an initial parameter of the inductor based on a premise that a rated current only flows through a branch of the inductor and reactive power consumed by the series passive impedance adapter is preset A times rated power of a converter.
  S22: Determine an initial parameter of the resistor based on a premise that a resistance value of the resistor is greater than or equal to a maximum value of the AC impedance evaluation index of the VSC-HVDC transmission system within the specified frequency range.

S23: Determine an initial parameter of the capacitor based on a premise that capacitive reactance of the capacitor is C times inductive reactance of the inductor.

S24: Determine a parameter change range of the inductor based on the initial parameter of the inductor and a preset multiple change range of the initial parameter of the inductor.

S25: Determine a parameter change range of the resistor based on the initial parameter of the resistor and a preset multiple change range of the initial parameter of the resistor.

S26: Determine a parameter change range of the capacitor based on the initial parameter of the capacitor and a preset multiple change range of the initial parameter of the capacitor.

S27: Determine a parameter combination change range based on the parameter change range of the inductor, the parameter change range of the resistor, and the parameter change range of the capacitor.

S28: Calculate a reactive power consumption and an active power loss of the series passive impedance adapter under each parameter combination within the parameter combination change range; where for any parameter combination, if the reactive power consumption of the series passive impedance adapter is greater than A times the rated power of the converter, or Re{$Z_{adapter}(f)$}>X(f) is not always satisfied within the specified frequency range, the active power loss is denoted as N*B times the rated power of the converter, where Re{$Z_{adapter}(f)$} represents a real part of an impedance transfer function of the series passive impedance adapter, and X(f) represents the AC impedance evaluation index of the VSC-HVDC transmission system.

S29: Obtain a parameter combination with a lowest active power loss based on the active power loss of each parameter combination.

Step 3:

If the parameter combination with the lowest active power loss satisfies a condition that Re{$Z_{adapter}(f)$}>X(f) is always satisfied within the specified frequency range, reduce a value of A or B, and return to step 2 until the parameter combination with the lowest active power loss does not satisfy the condition that Re{$Z_{adapter}(f)$}>X(f) is always satisfied within the preset frequency band range, so as to obtain a global optimal parameter combination; or if none of parameter combinations within the parameter combination change range satisfies the condition that Re{$Z_{adapter}(f)$}>X(f) is always satisfied within the specified frequency range, increases a value of A or B, and returns to step 2 until a global optimal parameter is obtained.

As an example of this embodiment of the present disclosure, the AC impedance of the VSC-HVDC transmission system includes an AC impedance amplitude of the VSC-HVDC transmission system and an AC impedance phase of the VSC-HVDC transmission system, and the calculating an AC impedance evaluation index of the VSC-HVDC transmission system based on the AC impedance of the VSC-HVDC transmission system includes:

calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin.

Compared with the prior art, this embodiment of the present disclosure can realize a positive impedance characteristic within a concerned frequency band and completely eliminate a risk of harmonic resonance.

As an example of this embodiment of the present disclosure, the calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin specifically includes:

calculating the AC impedance evaluation index of the VSC-HVDC transmission system according to a formula $$X(f) = -\min\left[mag(f) \times 10^{\frac{GM}{20}} \times \cos(phase(f) + PM), \right.$$
$$\left. mag(f) \times 10^{\frac{GM}{20}} \times \cos(phase(f) - PM)\right],$$

where mag(f) represents the AC impedance amplitude of the VSC-HVDC transmission system, phase(f) represents the AC impedance phase of the VSC-HVDC transmission system, GM represents the amplitude margin, in units of dB, and PM represents the phase angle margin, in units of deg.

In this embodiment of the present disclosure, it should be understood that GM represents the amplitude margin, in units of dB, and PM represents the phase angle margin, which is selected based on an engineering requirement. For example, GM may be 3 dB, and PM may be 3 deg.

In this embodiment of the present disclosure, specifically, the AC impedance amplitude and the AC impedance phase of the VSC-HVDC transmission system can be obtained through impedance scanning or calculated according to corresponding formulas.

It needs to be additionally noted that resonance may occur in a frequency band with X(f)>0.

As an example of this embodiment of the present disclosure, C is equal to 100.

As an example of this embodiment of the present disclosure, N is equal to 10.

The following provides a design example based on a premise that C is equal to 100, N is equal to 10, the parameter change range of the inductor is (0.8 to 1.2)*the initial parameter of the inductor, the parameter change range of the resistor is (1 to 2)*the initial parameter of the resistor, and the parameter change range of the capacitor is (0 to 1)*the initial parameter of the capacitor.

It is assumed that inductance of the inductor L (AC equivalent inductor of the VSC-HVDC transmission system) is 183 mH, a delay of a control link is 300 μs, a PI control parameter is 90900, a butterworth low-pass filter with a cut-off frequency of 200 Hz is adopted for feedforward, and a rated capacity is 1500 MW.

Step 1:

Obtain AC impedance of the VSC-HVDC transmission system within a specified frequency range through impedance scanning, where the AC impedance of the VSC-HVDC transmission system includes an AC impedance amplitude mag(f) of the VSC-HVDC transmission system and an AC impedance phase phase(f) of the VSC-HVDC transmission system.

In this embodiment, only influence of current inner-loop and feedforward control is considered, and an adopted impedance transfer function is $$Z_{1withFilter} = \frac{sL + G_{PI}G_d}{1 - G_dG_{filter}},$$

where $G_{PI}$ represents a PI controller, $G_d$ represents the link delay, and $G_{filter}$ represents the low-pass filter.

Figure 5:
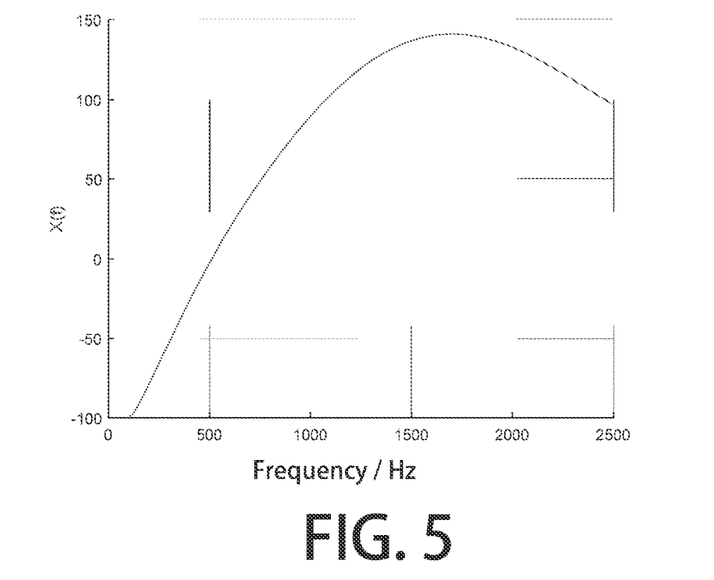
FIG. 5 is a schematic diagram of an X(f) curve according to an embodiment of the present disclosure.

An AC impedance evaluation index of the VSC-HVDC transmission system is obtained according to the formula $$X(f) = -\min\left[mag(f) \times 10^{\frac{GM}{20}} \times \cos(\text{phase}(f) + PM),\right.$$
$$\left. mag(f) \times 10^{\frac{GM}{20}} \times \cos(\text{phase}(f) - PM)\right],$$

and a curve of the AC impedance evaluation index of the VSC-HVDC transmission system within the specified frequency range is obtained based on the AC impedance evaluation index of the VSC-HVDC transmission system within the specified frequency range, as shown in FIG. 5.

A is set to 2%, and B is set to 1/100000.

The following initial parameters are obtained by performing S20 to S22: L=35.1 mH, R=141.27Ω, and C=2.89 μF.

An active power loss of the series passive impedance adapter within a range of 0.8 L-1.2 L, 0-C, and R-2R is obtained to obtain a parameter combination with a lowest active power loss. The obtained parameter combination with the lowest active power loss is as follows: L=28.1 mH, R=141.27Ω, and C=0.866 μF. The active power loss is 2.22 kW, and a reactive power consumption is 24 Mvar.

Figure 6:
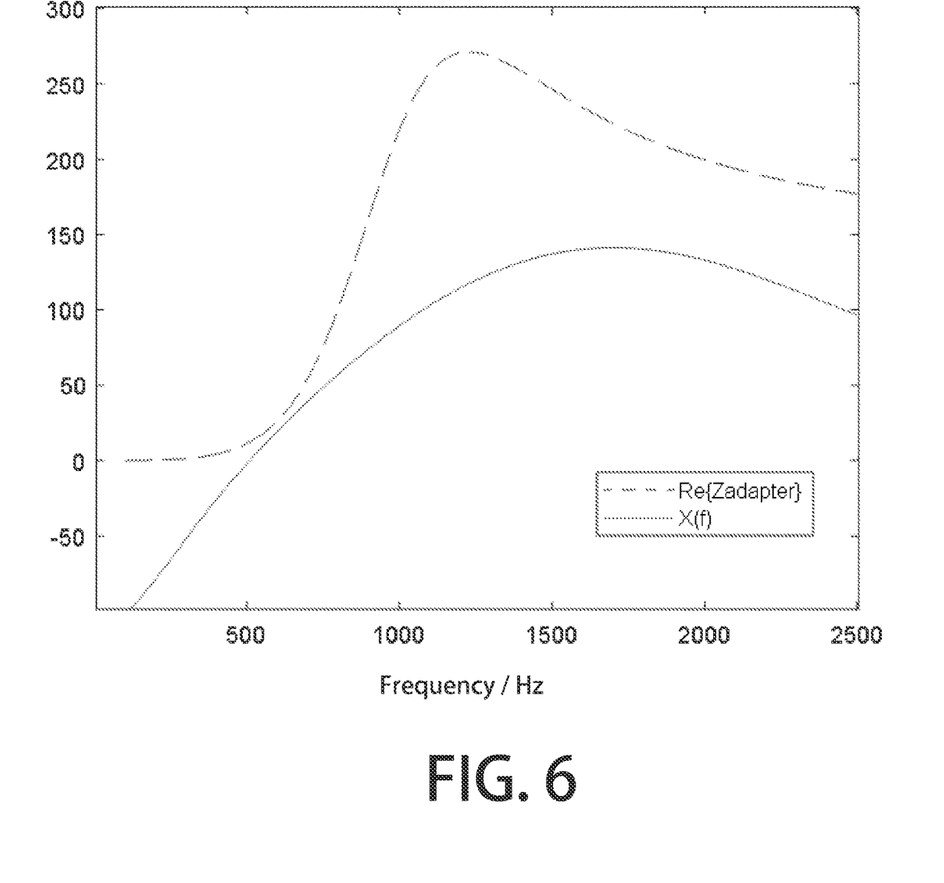
FIG. 6 is a schematic diagram illustrating an Re{$Z_{adapter}$(f)} curve and an X(f) under a parameter combination according to an embodiment of the present disclosure.
Figure 7:
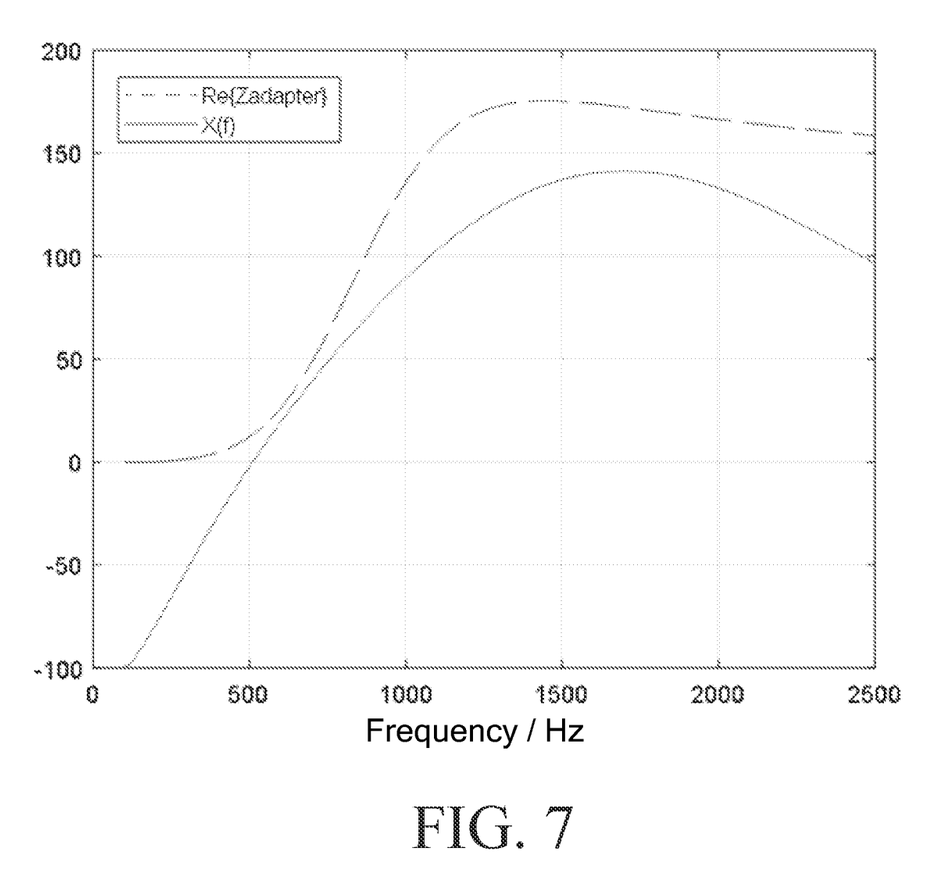
FIG. 7 is a schematic diagram illustrating an Re{$Z_{adapter}$(f)} curve and an X(f) under another parameter combination according to an embodiment of the present disclosure.
Figure 8:
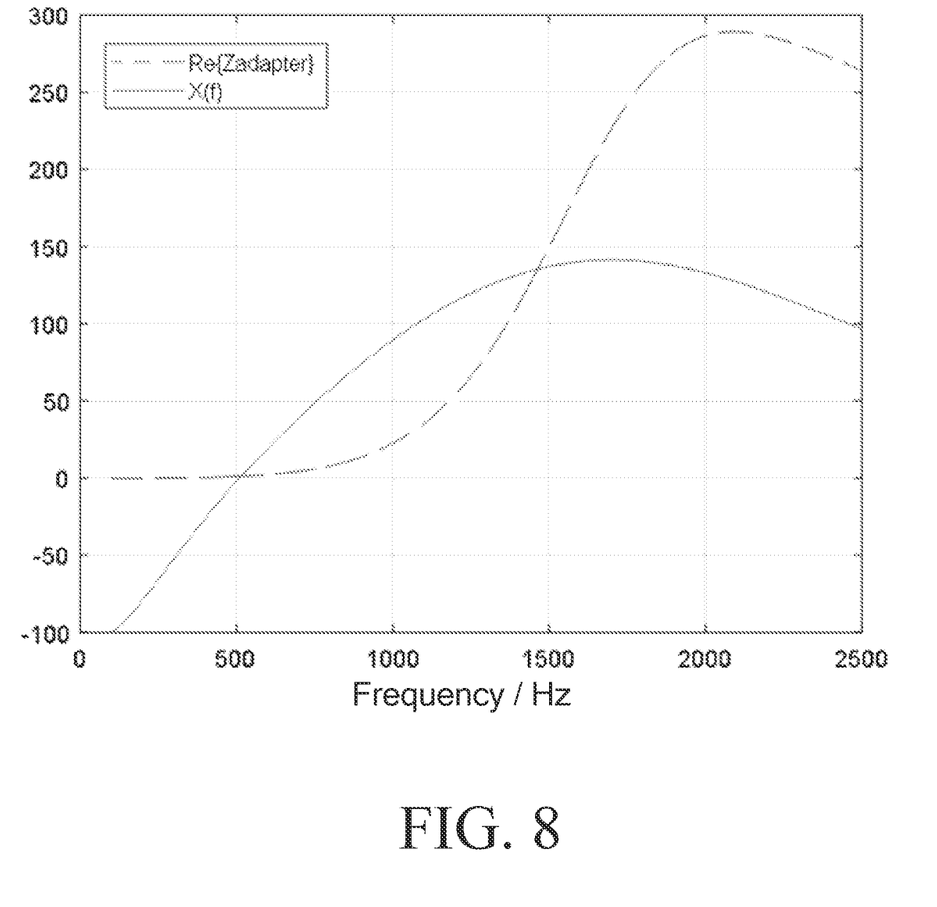
FIG. 8 is a schematic diagram illustrating an Re{$Z_{adapter}$(f)} curve and an X(f) under still another parameter combination according to an embodiment of the present disclosure.

An Re{$Z_{adapter}$(f)} curve and an X(f) curve under the parameter combination are obtained, as shown in FIG. 6. It can be seen from FIG. 6 that if Re{$Z_{adapter}$(f)}>X(f) is always satisfied within the specified frequency range, A is reduced to 1.4%. Step 1 is repeatedly performed to obtain the following initial parameters: L=24.6 mH, R=141.27Ω, and C=4.13 μF. An active power loss of the series passive impedance adapter within the range of 0.8 L-1.2 L, 0-C, and R-2R is obtained to obtain a parameter combination with a lowest active power loss. The obtained parameter combination with the lowest active power loss is as follows: L=22.1 mH, R=141.27Ω, and C=1.24 μF. A fundamental loss is 2.8 KW, and the reactive power consumption is 18.9 Mvar. An Re{$Z_{adapter}$(f)} curve and an X(f) curve under the parameter combination are obtained, as shown in FIG. 7. It can be seen from FIG. 7 that if Re{$Z_{adapter}$(f)}>X(f) is always satisfied within the specified frequency range, A is reduced to 1.2%. Then step 1 is repeatedly performed to obtain the following initial parameters: L=21.1 mH, R=141.27Ω, and C=4.82 μF. In the range of 0.8 L-1.2 L, 0-C, and R-2R, as shown in FIG. 8, Re{$Z_{adapter}$(f)}>X(f) is not satisfied. In other words, there is no feasible parameter in the range.

Parameter optimization ends. The initial parameters are set as follows: L=22.1 mH, R=141.27Ω, and C=1.24 μF.

EMBODIMENT 2

This embodiment of the present disclosure provides a parameter design apparatus for a series passive impedance adapter, including a processor, a memory, and a computer program stored in the memory and executed by the processor, where the computer program is executed by the processor to implement the above-mentioned parameter design method for a series passive impedance adapter.

EMBODIMENT 3

This embodiment of the present disclosure provides a computer-readable storage medium. The computer-readable storage medium stores a computer program, and the computer program is run to control a device on which the computer-readable storage medium is located to implement the above-mentioned parameter design method for a series passive impedance adapter.

It should be noted that all or some of processes for implementing the method in the foregoing embodiments can be completed by a computer program instructing relevant hardware. The computer program may be stored in a computer-readable storage medium. The computer program is executed by a processor to perform the steps of the foregoing method embodiments. The computer program includes computer program code, and the computer program code may be in a form of source code, a form of object code, an executable file or some intermediate forms, and the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like. It should be further noted that the content contained in the computer-readable medium may be added or deleted properly according to the legislation and the patent practice in the jurisdiction. For example, in some jurisdictions, depending on the legislation and the patent practice, the computer-readable medium may not include the electrical carrier signal or the telecommunications signal.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A parameter design method for a series passive impedance adapter applicable to a voltage source converter based high voltage direct current (VSC-HVDC) transmission system, wherein the series passive impedance adapter comprises a capacitor, a resistor, and an inductor, and the capacitor and the resistor are connected to the inductor in parallel after being connected in series; and the parameter design method comprises the following steps:

step 1:

obtaining alternating current (AC) impedance of the VSC-HVDC transmission system within a specified frequency range; and calculating an AC impedance evaluation index of the VSC-HVDC transmission system based on the AC impedance of the VSC-HVDC transmission system;

step 2:

setting parameters A, B, and C;

calculating an initial parameter of the inductor, where a rated current only flows through a branch of the inductor and reactive power consumed by the series passive impedance adapter is A times rated power of a converter;

determining an initial parameter of the resistor, where a resistance value of the resistor is equal to a maximum value of the AC impedance evaluation index of the VSC-HVDC transmission system within the specified frequency range;

determining an initial parameter of the capacitor, where a capacitive reactance of the capacitor is C times inductive reactance of the inductor;

determining a parameter change range of the inductor based on the initial parameter of the inductor and a preset multiple change range of the initial parameter of the inductor;

determining a parameter change range of the resistor based on the initial parameter of the resistor and a preset multiple change range of the initial parameter of the resistor;

determining a parameter change range of the capacitor based on the initial parameter of the capacitor and a preset multiple change range of the initial parameter of the capacitor;

determining a parameter combination change range based on the parameter change range of the inductor, the parameter change range of the resistor, and the parameter change range of the capacitor;

calculating a reactive power consumption and an active power loss of the series passive impedance adapter under each parameter combination within the parameter combination change range;

wherein for any parameter combination, if the reactive power consumption of the series passive impedance adapter is greater than A times the rated power of the converter, or Re{$Z_{adapter}$(f)}>X(f) is not always satisfied within the specified frequency range, the active power loss is denoted as N*B times the rated power of the converter, wherein Re{$Z_{adapter}$(f)} represents a real part of an impedance transfer function of the series passive impedance adapter, and X(f) represents the AC impedance evaluation index of the VSC-HVDC transmission system; and obtaining a parameter combination with a lowest active power loss based on the active power loss of each parameter combination; and step 3:

if the parameter combination with the lowest active power loss satisfies a condition that Re{$Z_{adapter}$(f)}>X(f) is always satisfied within the specified frequency range, reducing a value of A or B, and returning to step 2 until the parameter combination with the lowest active power loss does not satisfy the condition that Re{$Z_{adapter}$(f)}>X(f) is always satisfied within the specified frequency range, to obtain a global optimal parameter combination; or if none of parameter combinations within the parameter combination change range satisfies the condition that Re{$Z_{adapter}$(f)}>X(f) is always satisfied within the specified frequency range, increasing a value of A or B, and returning to step 2 until a global optimal parameter is obtained.

2. The parameter design method for a series passive impedance adapter applicable to a VSC-HVDC transmission system according to claim 1, wherein the AC impedance of the VSC-HVDC transmission system comprises an AC impedance amplitude of the VSC-HVDC transmission system and an AC impedance phase of the VSC-HVDC transmission system, and the calculating an AC impedance evaluation index of the VSC-HVDC transmission system based on the AC impedance of the VSC-HVDC transmission system comprises:

calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin.

3. The parameter design method for a series passive impedance adapter applicable to a VSC-HVDC transmission system according to claim 2, wherein the calculating the AC impedance evaluation index of the VSC-HVDC transmission system based on the AC impedance amplitude of the VSC-HVDC transmission system, the AC impedance phase of the VSC-HVDC transmission system, an amplitude margin, and a phase angle margin specifically comprises:

calculating the AC impedance evaluation index of the VSC-HVDC transmission system according to a formula $$X(f) = -\min\left[mag(f) \times 10^{\frac{GM}{20}} \times \cos(\text{phase}(f) + PM),\right.$$
$$\left. mag(f) \times 10^{\frac{GM}{20}} \times \cos(\text{phase}(f) - PM)\right],$$

wherein mag(f) represents the AC impedance amplitude of the VSC-HVDC transmission system, phase(f) represents the AC impedance phase of the VSC-HVDC transmission system, GM represents the amplitude margin, in units of dB, and PM represents the phase angle margin, in units of deg.

4. The parameter design method for a series passive impedance adapter applicable to a VSC-HVDC transmission system according to claim 1, wherein the real part of the impedance transfer function of the series passive impedance adapter is calculated according to a formula $$\text{Re}\{Z_{adapter}(f)\} = \text{Re}\left\{\frac{s^2 LCR + sL}{s^2 LC + sCR + 1}\right\},$$

wherein L represents the inductor, R represents the resistor, C represents the capacitor, and S represents a Laplace operator.

5. The parameter design method for a series passive impedance adapter applicable to a VSC-HVDC transmission system according to claim 1, wherein the active power loss of the series passive impedance adapter is calculated according to a formula $$P_{loss} = \left(\frac{P_{norm}}{\sqrt{3}\, U_{grid}}\right)^2 \times \text{Re}\{Z_{adapter}(f_{fund})\},$$

wherein $P_{loss}$ represents the active power loss of the series passive impedance adapter, $P_{norm}$ represents rated power of the VSC-HVDC transmission system, $U_{grid}$ represents a voltage of an AC grid connected to the VSC-HVDC transmission system, and $f_{fund}$ represents a fundamental frequency.

6. The parameter design method for a series passive impedance adapter applicable to a VSC-HVDC transmission system according to claim 1, wherein if the multiple change range of the initial parameter of the inductor is 0.8 to 1.2 times, the multiple change range of the initial parameter of the resistor is 1 to 2 times, and the multiple change range of the initial parameter of the capacitor is 0 to 1 times, the parameter change range of the inductor is (0.8 to 1.2)*the initial parameter of the inductor, the parameter change range of the resistor is (1 to 2)*the initial parameter of the resistor, and the parameter change range of the capacitor is (0 to 1)*the initial parameter of the capacitor.

7. The parameter design method for a series passive impedance adapter applicable to a VSC-HVDC transmission system according to claim 1, wherein the parameter C is equal to 100.

8. The parameter design method for a series passive impedance adapter applicable to a VSC-HVDC transmission system according to claim 1, wherein N is equal to 10.

9. A parameter design apparatus for a series passive impedance adapter applicable to a VSC-HVDC transmission system, comprising a processor, a memory, and a computer program stored in the memory and executed by the processor, wherein the computer program is executed by the processor to implement the parameter design method for a series passive impedance adapter applicable to a VSC-HVDC transmission system according to claim 1.

10. A non-transitory computer-readable storage medium, wherein the computer-readable storage medium stores a computer program, and the computer program is run to control a device on which the computer-readable storage medium is located to execute the parameter design method for a series passive impedance adapter applicable to a VSC-HVDC transmission system according to claim 1.

* * * * *